(12) United States Patent
Thompson et al.

(10) Patent No.: US 8,856,451 B2
(45) Date of Patent: Oct. 7, 2014

(54) METHOD AND APPARATUS FOR ADAPTING AGGRESSIVENESS OF A PRE-FETCHER

(75) Inventors: Stephen P. Thompson, Longmont, CO (US); Tarun Nakra, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 390 days.

(21) Appl. No.: 12/869,163

(22) Filed: Aug. 26, 2010

(65) Prior Publication Data

US 2012/0054448 A1    Mar. 1, 2012

(51) Int. Cl.
*G06F 13/00*    (2006.01)
*G06F 13/28*    (2006.01)

(52) U.S. Cl.
CPC .... *G06F 12/8062* (2013.01); *G06F 2212/6026* (2013.01)

USPC .................................. 711/137; 711/E12.057

(58) Field of Classification Search
CPC ............ G06F 12/0862; G06F 12/0868; G06F 2212/6024
USPC ............................................ 711/137, E12.057
See application file for complete search history.

(56) References Cited

U.S. PATENT DOCUMENTS

| | | | |
|---|---|---|---|
| 2009/0070556 A1* | 3/2009 | Griswell et al. | 712/207 |
| 2011/0173397 A1* | 7/2011 | Boyle et al. | 711/137 |

* cited by examiner

*Primary Examiner* — Edward Dudek, Jr.

(57) ABSTRACT

The present invention provides a method and apparatus for adapting aggressiveness of a pre-fetcher in a processor-based system. One embodiment includes modifying a rate for pre-fetching data from a memory into one or more caches by comparing a first address of a memory access request to addresses in an address window that includes one or more previously fetched addresses and one or more addresses to be fetched.

28 Claims, 9 Drawing Sheets

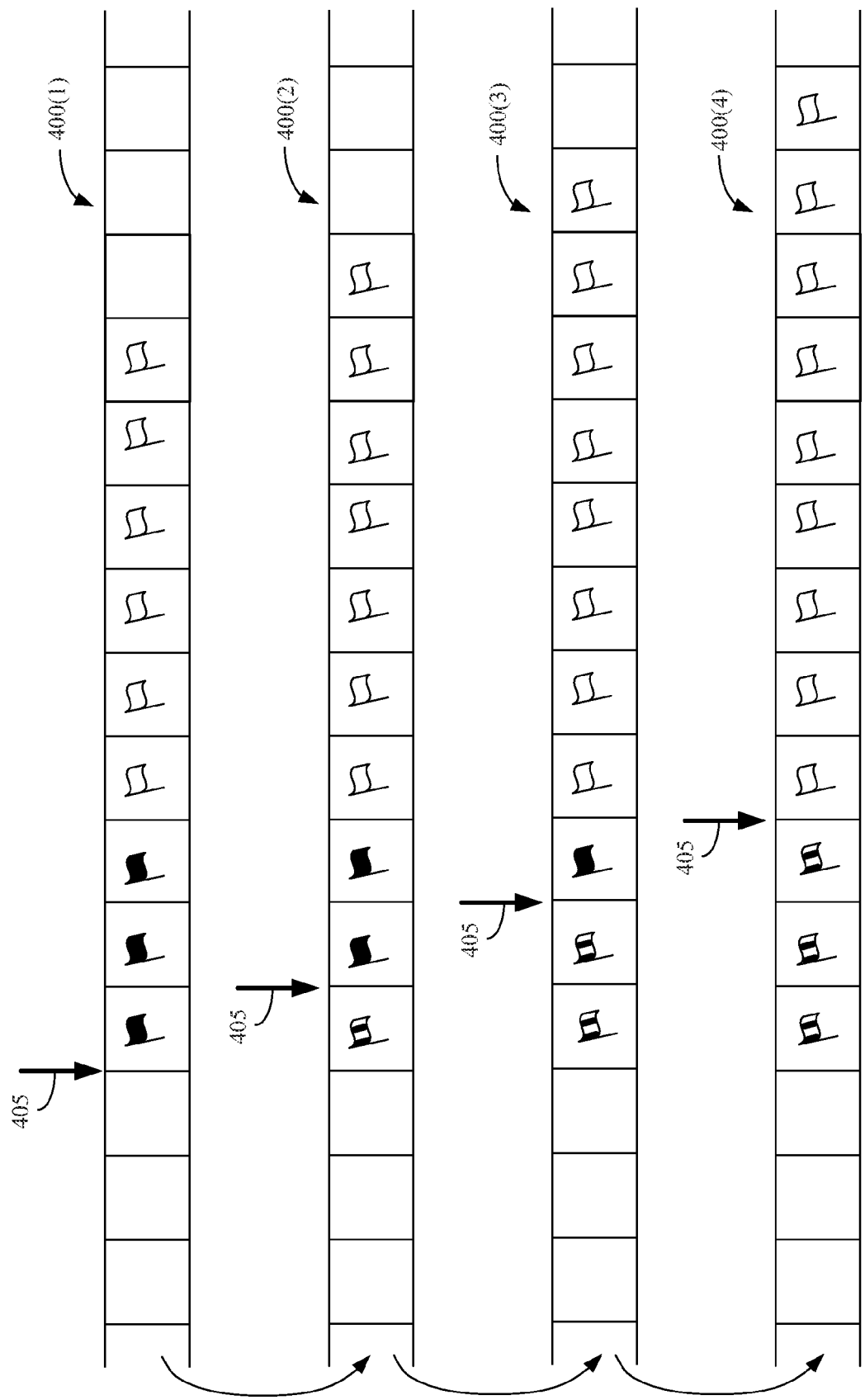

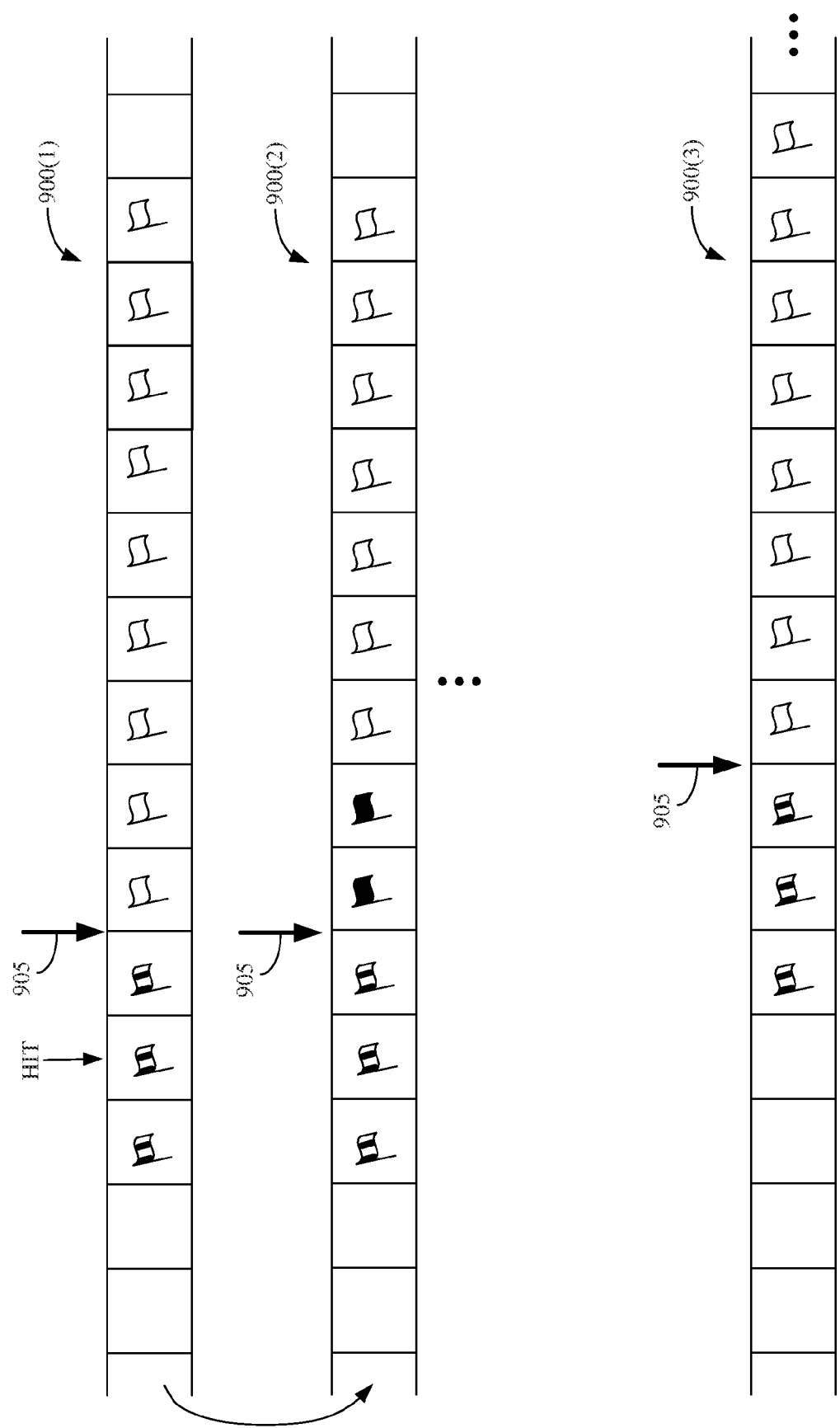

METHOD AND APPARATUS FOR ADAPTING AGGRESSIVENESS OF A PRE-FETCHER

BACKGROUND OF THE INVENTION

1. Field of the Invention

This invention relates generally to processor-based systems, and, more particularly, to pre-fetching in a processor-based system.

2. Description of the Related Art

Many processing devices utilize caches to reduce the average time required to access information stored in a memory. A cache is a smaller and faster memory that stores copies of instructions and/or data that are expected to be used relatively frequently. For example, central processing units (CPUs) are generally associated with a cache or a hierarchy of cache memory elements. Other processors, such as graphics processing units, can also implement cache systems. Instructions or data that are expected to be used by the CPU are moved from (relatively large and slow) main memory into the cache. When the CPU needs to read or write a location in the main memory, it first checks to see whether a copy of the desired memory location is included in the cache memory. If this location is included in the cache (a cache hit), then the CPU can perform the read or write operation on the copy in the cache memory location. If this location is not included in the cache (a cache miss), then the CPU needs to access the information stored in the main memory and, in some cases, the information can be copied from the main memory and added to the cache. Proper configuration and operation of the cache can reduce the average latency of memory accesses to a value below the main memory latency and close to the cache access latency.

A pre-fetcher can be used to populate the lines in the cache before the information in these lines has been requested. The pre-fetcher can monitor memory requests associated with applications running in the CPU and use the monitored requests to determine or predict that the CPU is likely to access a particular sequence of memory addresses in the main memory. For example, the pre-fetcher may detect sequential memory accesses by the CPU by monitoring a miss address buffer that stores addresses of previous cache misses. The pre-fetcher can then attempt to predict future memory accesses by extrapolating based upon the current and/or previous sequential memory accesses. The pre-fetcher fetches the information from the predicted addressed locations in the main memory and stores this information in the cache so that the information is available before it is requested by the CPU. Pre-fetchers can keep track of multiple streams and independently pre-fetch data for the different streams.

Conventional pre-fetching algorithms can improve the performance of the cache system, particularly when the CPU is executing a series of memory accesses to sequential memory locations. However, conventional pre-fetching algorithms can encounter difficulties in a number of circumstances. For example, there is some latency between the time a pre-fetch request is posted and performance/issuance of the pre-fetch request, e.g. fetching the data into the cache. If a cache miss occurs to a posted pre-fetch memory address before the request issues, the pre-fetcher can fall behind the stream of memory requests. When the pre-fetcher falls behind it is fetching information into the caches after it has been requested by the CPU. For another example, in some cases the CPU requests are not perfectly sequential and instead have holes or gaps when the requests skip over some addresses in the address sequence. Conventional pre-fetchers may not associate the address requests that follow the holes or gaps as being part of the same sequence as the addresses that preceded the holes or gaps. The pre-fetcher may therefore allocate a new stream to the address requests that follow the holes/gaps instead of pre-fetching this information as part of the stream associated with the addresses that preceded the holes/gaps.

SUMMARY OF EMBODIMENTS OF THE INVENTION

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for adapting aggressiveness of a pre-fetcher in a processor-based system. One embodiment includes modifying a rate for pre-fetching data from a memory into one or more caches by comparing a first address of a memory access request to addresses in an address window that includes one or more previously fetched addresses and one or more addresses to be fetched. Alternative embodiments may include means for modifying the rate for pre-fetching data from the memory based on the comparison and processor-based systems that include pre-fetchers configured to modify the rate for pre-fetching data from the memory based on the comparison.

BRIEF DESCRIPTION OF THE DRAWINGS

The disclosed subject matter may be understood by reference to the following description taken in conjunction with the accompanying drawings, in which like reference numerals identify like elements, and in which:

FIG. 4 conceptually illustrates a first exemplary embodiment of an address sequence that includes addresses that can be flagged and pre-fetched;

FIG. 9 conceptually illustrates a fourth exemplary embodiment of an address sequence that includes addresses that can be flagged and pre-fetched;

Figure 1:
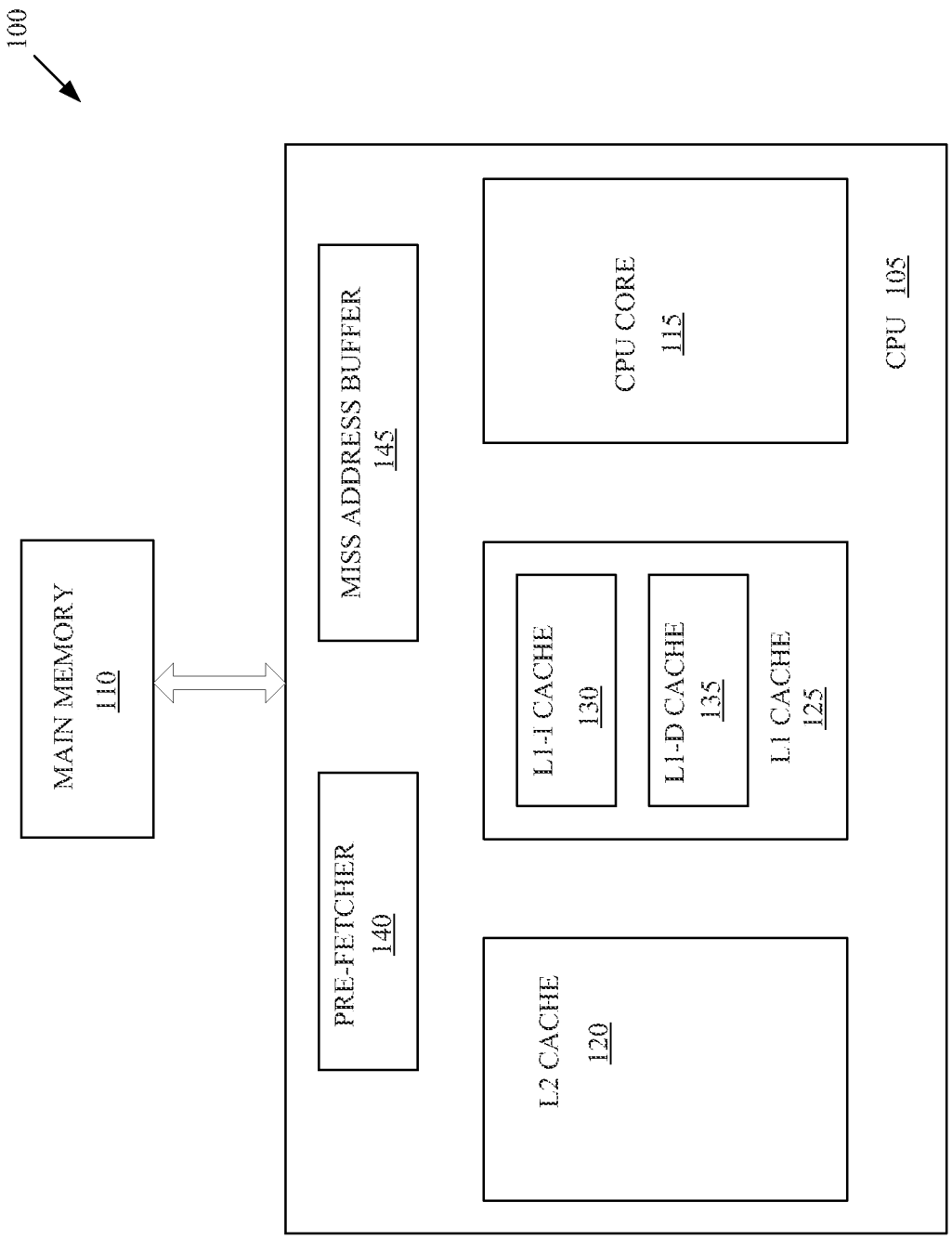
FIG. 1 conceptually illustrates a first exemplary embodiment of a semiconductor device that may be formed in or on a semiconductor wafer.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the present application describes embodiments of techniques that are used to modify the aggressiveness of a pre-fetcher by comparing the addresses of cache hits/misses within the memory access stream to addresses within a look-ahead window of pending pre-fetch requests. In one embodiment, the look-ahead window can be defined by assigning flags to a sequence of addresses proximate a base address that indicates the next address to be pre-fetched for a pre-fetch stream. The rate of pre-fetching data from a memory into the cache can be modified based on a comparison of an address of a memory access request to a sequence of flagged addresses, which may include addresses of previously fetched data and addresses that are expected to be pre-fetched. The flags associated with different addresses can be set to indicate that a pre-fetcher should pre-fetch the data at these addresses. Cache hits or misses to the flagged addresses can accelerate the rate of pre-fetching by causing the pre-fetcher to set additional flags. The rate of pre-fetching may decelerate when substantially all of the data at addresses associated with set flags has been pre-fetched from the memory to the cache. The pre-fetcher may then wait until additional cache hits and/or misses are detected before setting additional flags and pre-fetching more information.

FIG. 1 conceptually illustrates a first exemplary embodiment of a semiconductor device 100 that may be formed in or on a semiconductor wafer (or die). The semiconductor device 100 may formed in or on the semiconductor wafer using well known processes such as deposition, growth, photolithography, etching, planarising, polishing, annealing, and the like. In the illustrated embodiment, the device 100 includes a central processing unit (CPU) 105 that is configured to access instructions and/or data that are stored in the main memory 110. In the illustrated embodiment, the CPU 105 includes at least one CPU core 115 that is used to execute the instructions and/or manipulate the data. The CPU 105 also implements a hierarchical (or multilevel) cache system that is used to speed access to the instructions and/or data by storing selected instructions and/or data in the caches. However, persons of ordinary skill in the art having benefit of the present disclosure should appreciate that alternative embodiments of the device 100 may implement different configurations of the CPU 105, such as configurations that use external caches. Moreover, the techniques described in the present application may be applied to other processors such as graphical processing units (GPUs), accelerated processing units (APUs), and the like.

The illustrated cache system includes a level 2 (L2) cache 120 for storing copies of instructions and/or data that are stored in the main memory 110. In the illustrated embodiment, the L2 cache 120 is 16-way associative to the main memory 110 so that each line in the main memory 110 can potentially be copied to and from 16 particular lines (which are conventionally referred to as "ways") in the L2 cache 120. However, persons of ordinary skill in the art having benefit of the present disclosure should appreciate that alternative embodiments of the main memory 110 and/or the L2 cache 120 can be implemented using any associativity. Relative to the main memory 110, the L2 cache 120 may be implemented using smaller and faster memory elements. The L2 cache 120 may also be deployed logically and/or physically closer to the CPU core 115 (relative to the main memory 110) so that information may be exchanged between the CPU core 115 and the L2 cache 120 more rapidly and/or with less latency.

The illustrated cache system also includes an L1 cache 125 for storing copies of instructions and/or data that are stored in the main memory 110 and/or the L2 cache 120. Relative to the L2 cache 120, the L1 cache 125 may be implemented using smaller and faster memory elements so that information stored in the lines of the L1 cache 125 can be retrieved quickly by the CPU 105. The L1 cache 125 may also be deployed logically and/or physically closer to the CPU core 115 (relative to the main memory 110 and the L2 cache 120) so that information may be exchanged between the CPU core 115 and the L1 cache 125 more rapidly and/or with less latency (relative to communication with the main memory 110 and the L2 cache 120). Persons of ordinary skill in the art having benefit of the present disclosure should appreciate that the L1 cache 125 and the L2 cache 120 represent one exemplary embodiment of a multi-level hierarchical cache memory system. Alternative embodiments may use different multilevel caches including elements such as L0 caches, L1 caches, L2 caches, L3 caches, and the like.

In the illustrated embodiment, the L1 cache 125 is separated into level 1 (L1) caches for storing instructions and data, which are referred to as the L1-I cache 130 and the L1-D cache 135. Separating or partitioning the L1 cache 125 into an L1-I cache 130 for storing only instructions and an L1-D cache 135 for storing only data may allow these caches to be deployed closer to the entities that are likely to request instructions and/or data, respectively. Consequently, this arrangement may reduce contention, wire delays, and generally decrease latency associated with instructions and data. In one embodiment, a replacement policy dictates that the lines in the L1-I cache 130 are replaced with instructions from the L2 cache 120 and the lines in the L1-D cache 135 are replaced with data from the L2 cache 120. However, persons of ordinary skill in the art should appreciate that alternative embodiments of the L1 cache 125 may not be partitioned into separate instruction-only and data-only caches 160, 165.

The CPU 105 also includes a pre-fetcher 140 that can be used to populate lines in one or more of the caches 120, 125, 130, 135. The pre-fetcher 140 is depicted in the illustrated embodiment as a separate logical element within the CPU 105. However, persons of ordinary skill in the art having benefit of the present disclosure should appreciate that the pre-fetcher 140 may alternatively be implemented as a part of other logical elements. For example, the pre-fetcher 140 may be implemented as a part of the logic of the L1-D cache 135. In one embodiment, the pre-fetcher 140 can monitor memory requests associated with applications running in the CPU core 115. For example, the pre-fetcher 140 can monitor memory requests that result in cache hits and/or misses, which may be recorded in a miss address buffer 145. The pre-fetcher 140 may determine or predict that the CPU core 115 is likely to access a particular sequence of memory addresses in the main memory 110. For example, the pre-fetcher 140 may detect two or more sequential memory accesses by the CPU core 115. The direction of the sequence can be determined based on the temporal sequence of the sequential memory accesses and the CPU core 115 can use this direction to predict future memory accesses by extrapolating based upon the current and/or previous sequential memory accesses. The pre-fetcher 140 can then fetch the information in the predicted locations from the main memory 110 and store this information in an appropriate cache so that the information is available before it is requested by the CPU core 115.

Figure 2:
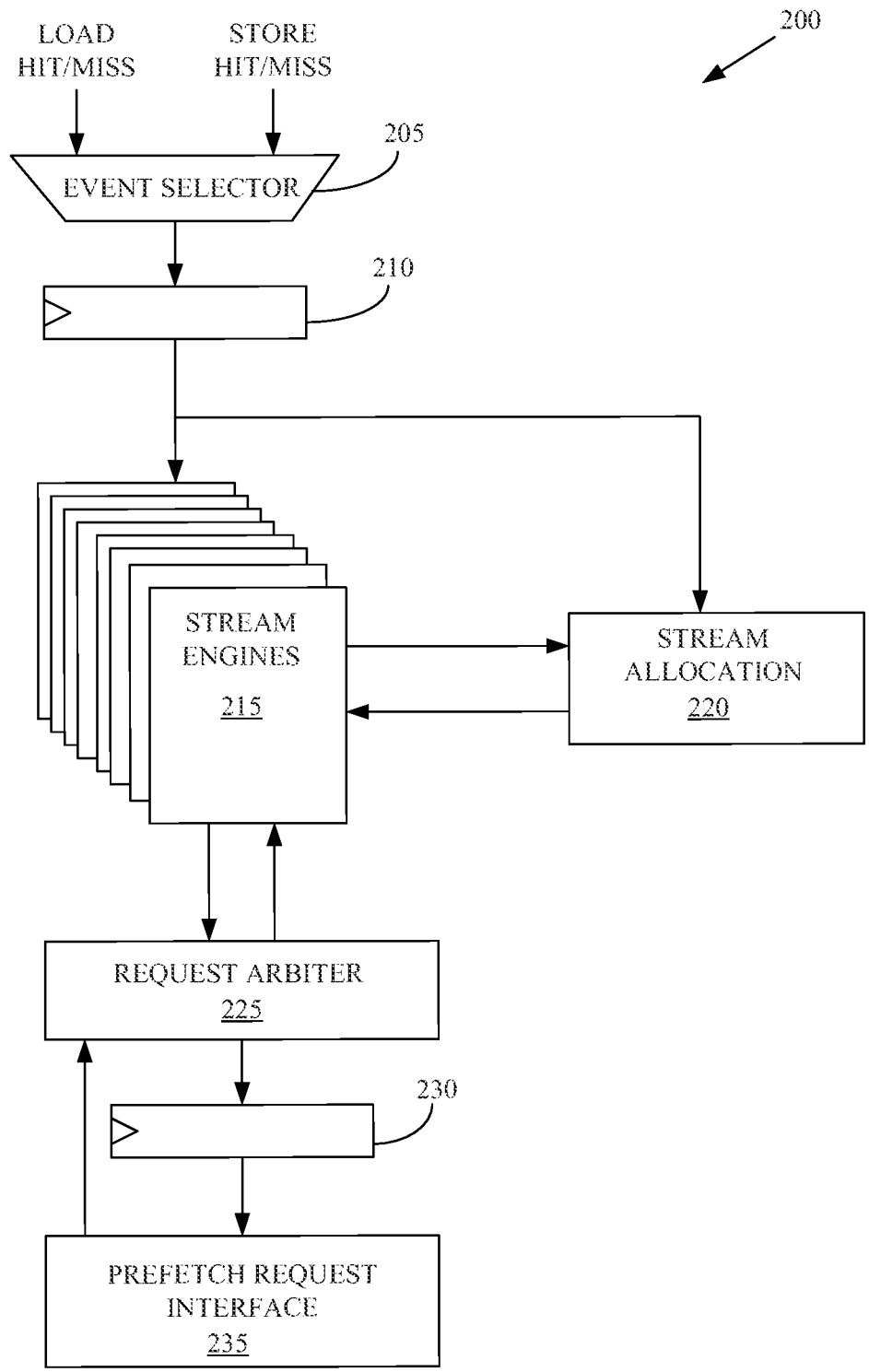
FIG. 2 conceptually illustrates one exemplary embodiment of a pre-fetcher.

FIG. 2 conceptually illustrates one exemplary embodiment of a pre-fetcher 200 such as the pre-fetcher 140 of FIG. 1. In the illustrated embodiment, the pre-fetcher 200 receives signals indicating particular events related to memory access requests such as hits and/or misses associated with a load instruction, hits and/or misses associated with a store instruction, and the like. Miss address buffer (MAB) events, such as hit and miss events for loads and stores, may be received or accessed by an event selector block 205, which is used to select events that are to be passed to other stages of the pre-fetcher 200. For example, the highest priority event may be stored in the registers 210 until they are passed to one or more stream engines 215 and a stream allocation unit 220, e.g., during a subsequent clock cycle. The priority of events can be determined using a hierarchy such as giving the highest priority to load misses and then assigning successively lower priorities to store misses, load hits, and store hits. However, persons of ordinary skill in the art having benefit of the present disclosure should appreciate that alternative hierarchies can be used to establish the priorities of the events.

In the illustrated embodiment, the pre-fetcher 200 includes multiple stream engines 215 that can each be used to manage a separate pre-fetch stream. Each stream engine 215 may provide a signal to the stream allocation unit 220 to indicate that the current event either hit or missed the stream managed by the stream engine 215. If none of the existing streams indicates a hit for the MAB miss event, then the stream allocation unit 220 can allocate a new stream to a different stream engine 215 using the current event information. When a stream is first allocated, the stream engine sets a page address and/or an offset value to the current event cache line address. The stream engine 215 can then monitor further MAB events to detect events at addresses adjacent to the current event cache line address in either direction. For example, if the current event cache line address is set to A, then the stream engine 215 looks for events at addresses A+1 or A−1. If the stream engine 215 sees one of the addresses, it defines a stream in the appropriate direction (positive for A+1 and negative for A−1) and issues a selected number of pre-fetch requests. In one embodiment, the stream engine 215 maintains a set of pre-fetch flags that indicate pre-fetches for the current stream address, as discussed herein.

The pre-fetcher 200 may also include a request arbiter 225 that is used to arbitrate pre-fetch requests from the stream engines 215. In one embodiment, the request arbiter 225 is a rotating priority arbiter. However, persons of ordinary skill in the art having benefit of the present disclosure should appreciate that other types of request arbiter 225 may alternatively be implemented in the pre-fetcher 200. Requests can be transferred from the request arbiter 225 to a register 230 so that the request information can be provided to a pre-fetch request interface 235, e.g., during a subsequent clock cycle. The pre-fetch request interface 235 can provide feedback to the request arbiter 225, which can be used to select and/or arbitrate between pending requests from the stream engines 215.

Figure 3:
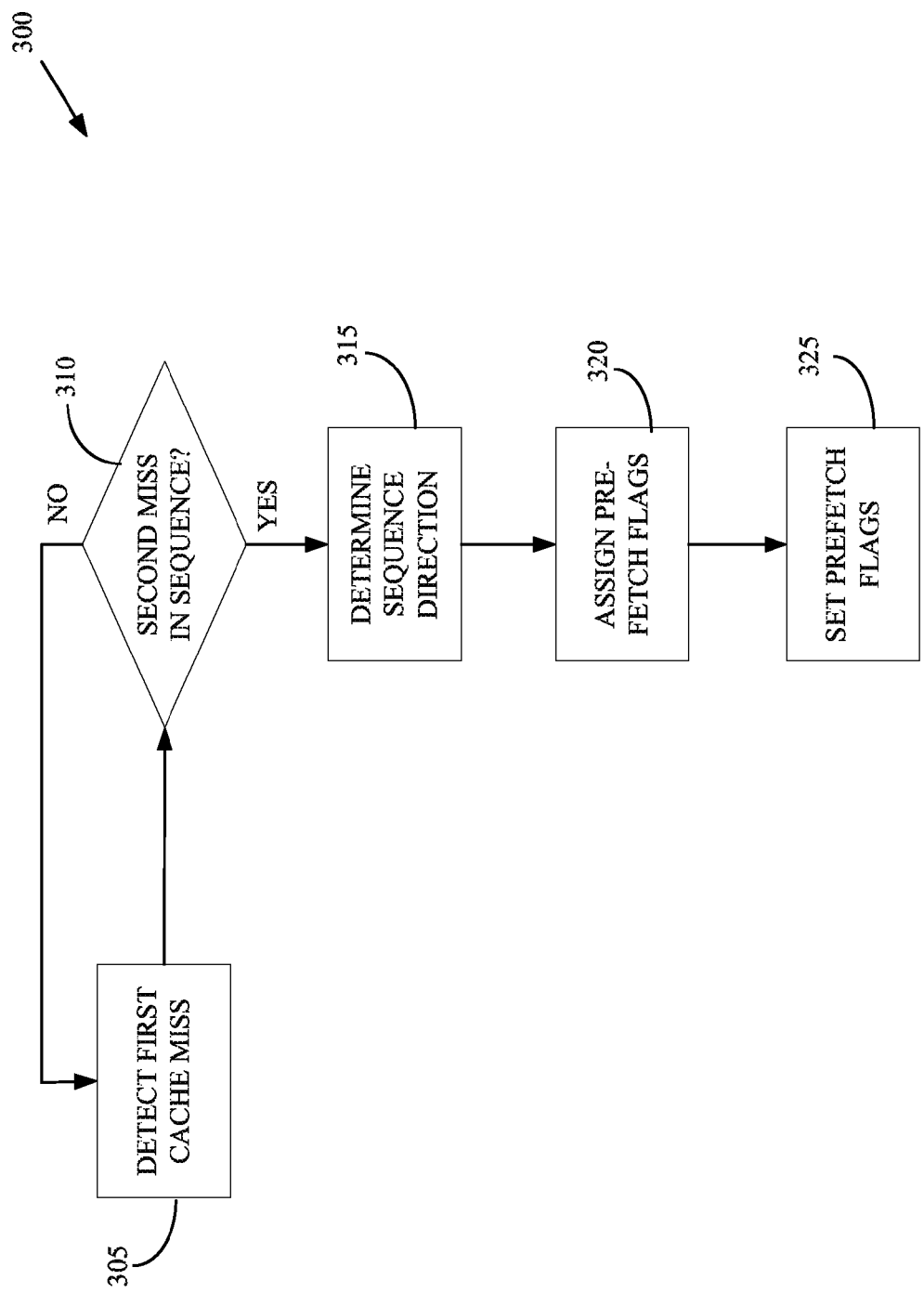
FIG. 3 conceptually illustrates one exemplary embodiment of a method for allocating a pre-fetch stream and identifying a look-ahead window using pre-fetch flags.

FIG. 3 conceptually illustrates one exemplary embodiment of a method 300 for allocating a pre-fetch stream and identifying a look-ahead window using pre-fetch flags. In the illustrated embodiment, a first cache miss is detected (at 305), e.g., using information about MAB events from a miss address buffer, and a stream is allocated to a pre-fetcher stream engine. The pre-fetcher stream engine then waits until it detects (at 310) a second miss that is in sequence (in the positive or negative direction) with the first cache miss. The stream engine can use the addresses of the first and second cache misses to determine (at 315) the sequence direction. Pre-fetch flags may be assigned (at 320) to a selected number of addresses in the pre-fetch stream. The addresses that are assigned flags follow the sequence established by the first and second cache misses. For example, flags can be assigned (at 320) to a selected number of addresses (e.g., nine addresses) that follow the address of the second miss in the direction established for the pre-fetch stream. A selected number of the flags can then be set (at 325) to indicate that the pre-fetcher should fetch information from these addresses in subsequent clock cycles. For example, flags of a subset of the addresses (e.g., three of the nine flagged addresses) can be set so that these addresses can be fetched from the memory into the caches.

FIG. 4 conceptually illustrates a first exemplary embodiment of an address sequence 400 that includes addresses that can be flagged and pre-fetched. The address sequences 400 (1-4) illustrate the same set of addresses at successive time intervals or clock cycles. In the illustrated embodiment, the address sequences 400(1-4) are depicted at successive clock cycles. However, persons of ordinary skill in the art having benefit of the present disclosure should appreciate that the address sequences 400(1-4) may not be strictly sequential and in some cases may be separated by other events, time intervals, clock cycles, and the like. In the illustrated embodiment, a pre-fetch stream engine has assigned flags to nine addresses ahead of a base address indicated by the arrow 405. The stream engine has also set flags of three of the addresses ahead of the base address 405, as indicated by the filled-in flags, to indicate that the information in these addresses of the memory should be fetched into the cache. The flags may be set in response to cache misses that are outside the look-ahead window of pre-fetch flags. Persons of ordinary skill in the art having benefit of the present disclosure should appreciate that the number of assigned flags and/or the number of flags in the subset of the assigned flags that are set are matters of design choice and may be varied to satisfy various design considerations.

The address sequence 400(1) has a set flag at the address ahead of the base address 405. The pre-fetcher may therefore fetch the data at this address into the cache. The base address 405 is then advanced to the next address and the address that was just fetched becomes part of the history of the stream and the flag at this address becomes a history flag that is indicated by the striped flag symbol and the address sequence 400(2). An additional flag may be assigned to the address following the last address in the sequence in the direction of the established sequence so that the number of flags ahead of the base address 405 remains the same. In the illustrated embodiment, the pre-fetcher continues to fetch the addresses that have set flags and advance the base address 405 until all of the addresses that have set flags have been fetched. As the address corresponding to each set flag is fetched, the flag associated with this address is changed into a history flag as shown in the address sequences 400(3-4). An additional flag is assigned to the next sequential address to maintain the number of flags ahead of the base address 405. History flags may also be dropped to maintain a set number of history flags trailing the base address 405.

Figures 5, 8:
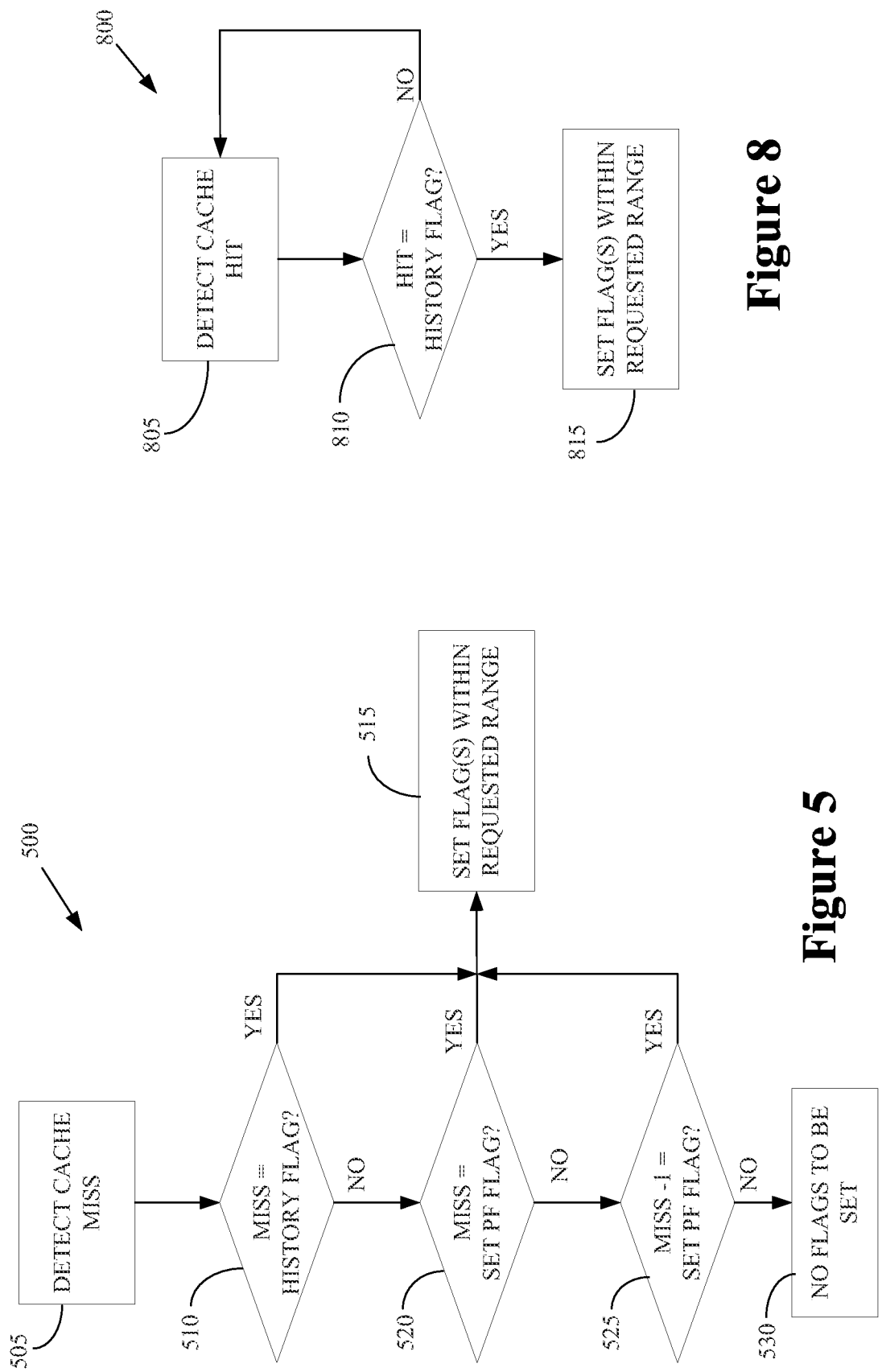
FIG. 5 conceptually illustrates a first exemplary embodiment of a method or modifying the aggressiveness of a pre-fetcher based on memory access events.
FIG. 8 conceptually illustrates a second exemplary embodiment of a method or modifying the aggressiveness of a pre-fetcher based on memory access events.

FIG. 5 conceptually illustrates a first exemplary embodiment of a method 500 for modifying the aggressiveness of a pre-fetcher based on memory access events. In the illustrated embodiment, a pre-fetcher stream engine has been trained to identify an address sequence including addresses that can be pre-fetched, e.g., so that the pre-fetched addresses are available for an application running on a processor in the system. The stream engine may have been trained using various techniques such as the method 300 shown in FIG. 3. In the illustrated embodiment, the stream engine detects (at 505) a cache miss to an address indicated in the miss address buffer. The stream engine determines (at 510) whether the cache miss is to an address associated with a sequence address that is flagged with a history flag indicating that the information at this address has been fetched into the cache. When the cache miss corresponds to an address flagged with a history flag, the stream engine may set (at 515) additional flags ahead of the current base address. A cache miss to a history flag may indicate that the pre-fetcher stream engine is at risk of falling behind the address requests. For example, a cache miss to a history flag may indicate that the pre-fetcher is predicting addresses correctly and keeping up with the demand requests but the data is not available in the cache, possibly due to conditions such as high memory latency. Setting (at 515) flags ahead of the base address can increase the aggressiveness of the pre-fetcher by allowing the pre-fetcher to fetch additional addresses whenever it has the opportunity.

In the illustrated embodiment, the stream engine may check (at 520) whether the cache miss is to an address that has been flagged with a set pre-fetch flag. If so, the stream engine sets (at 515) additional flags within the requested range. A cache miss to an address having a set pre-fetch flag may indicate that the pre-fetcher stream engine is falling behind the address requests. Setting (at 515) flags ahead of the base address can increase the aggressiveness of the pre-fetcher and allow the pre-fetcher to fetch additional addresses whenever it has the opportunity. Increasing the aggressiveness of the pre-fetcher in this way may allow the pre-fetcher to catch up with the address requests so that the pre-fetched information is available in the cache before it is requested. In the illustrated embodiment, the stream engine can also check (at 525) whether the cache miss is to address that has been assigned a flag and is just ahead of the addresses that have set flags. A cache miss to this address indicates that the pre-fetcher stream engine has fallen further behind the address requests. Setting (at 515) flags ahead of the base address can increase the aggressiveness of the pre-fetcher so that the pre-fetcher can catch up with the address requests and/or skip over holes or gaps in the request stream. If none of the conditions (at 510, 520, 525) are satisfied, then it may not be necessary to set or assign any additional flags (at 530).

Figure 6:
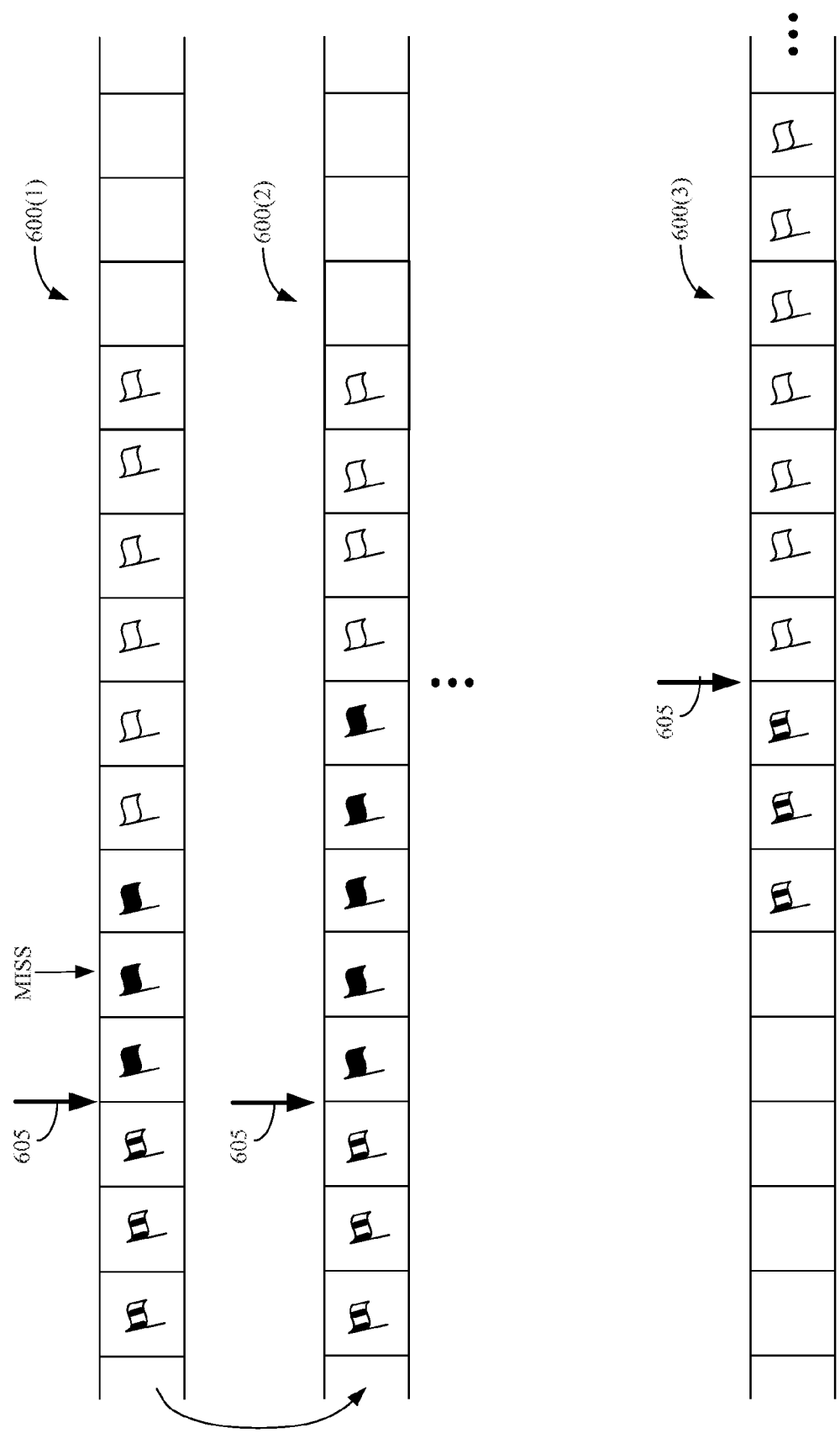
FIG. 6 conceptually illustrates a second exemplary embodiment of an address sequence that includes addresses that can be flagged and pre-fetched.

FIG. 6 conceptually illustrates a second exemplary embodiment of an address sequence 600 that includes addresses that can be flagged and pre-fetched. The address sequences 600(1-3) illustrate the same set of addresses at successive time intervals or clock cycles. In the illustrated embodiment, the address sequences 600(1-3) are depicted at successive clock cycles. However, persons of ordinary skill in the art having benefit of the present disclosure should appreciate that the address sequences 600(1-3) may not be strictly sequential and in some cases may be separated by other events, time intervals, clock cycles, and the like. In the illustrated embodiment, a pre-fetch stream engine has assigned flags to nine addresses ahead of a base address indicated by the arrow 605. The stream engine has also set three of the addresses ahead of the base address 605, as indicated by the filled-in flags, to indicate that the information in these addresses of the memory should be fetched into the cache. Three history flags have also been assigned to the addresses of the three most recently previously fetched addresses. Persons of ordinary skill in the art having benefit of the present disclosure should appreciate that the number of assigned flags, history flags, and/or the number of flags in the subset of the assigned flags that are set are matters of design choice and may be varied to satisfy various design considerations.

In the illustrated embodiment, the stream engine detects a miss at an address in the sequence 600(1) that has a set flag that is ahead of the base address 605. The stream engine may therefore increase the aggressiveness of the pre-fetcher by setting two additional flags ahead of the base address, as indicated in the sequence 600(2). The address sequence 600(2) has a set flag at the address ahead of the base address 605. The pre-fetcher may therefore fetch the data at this address into the cache. The base address 605 is then advanced to the next address and the address that was just fetched becomes part of the history of the stream and the flag at this address becomes a history flag. An additional flag is assigned to the address following the last address in the sequence in the direction of the established sequence so that the number of flags ahead of the base address 605 remains the same. In the illustrated embodiment, the pre-fetcher continues to fetch the addresses that have set flags and advance the base address 605 until all of the addresses that have set flags have been fetched. As the address corresponding to each set flag is fetched, the flag associated with this address is changed into a history flag as shown in the address sequence 600(3). An additional flag is assigned to the next sequential address to maintain the number of flags ahead of the base address 605 and history flags are dropped to maintain a set number of history flags trailing the base address 605.

Figure 7:
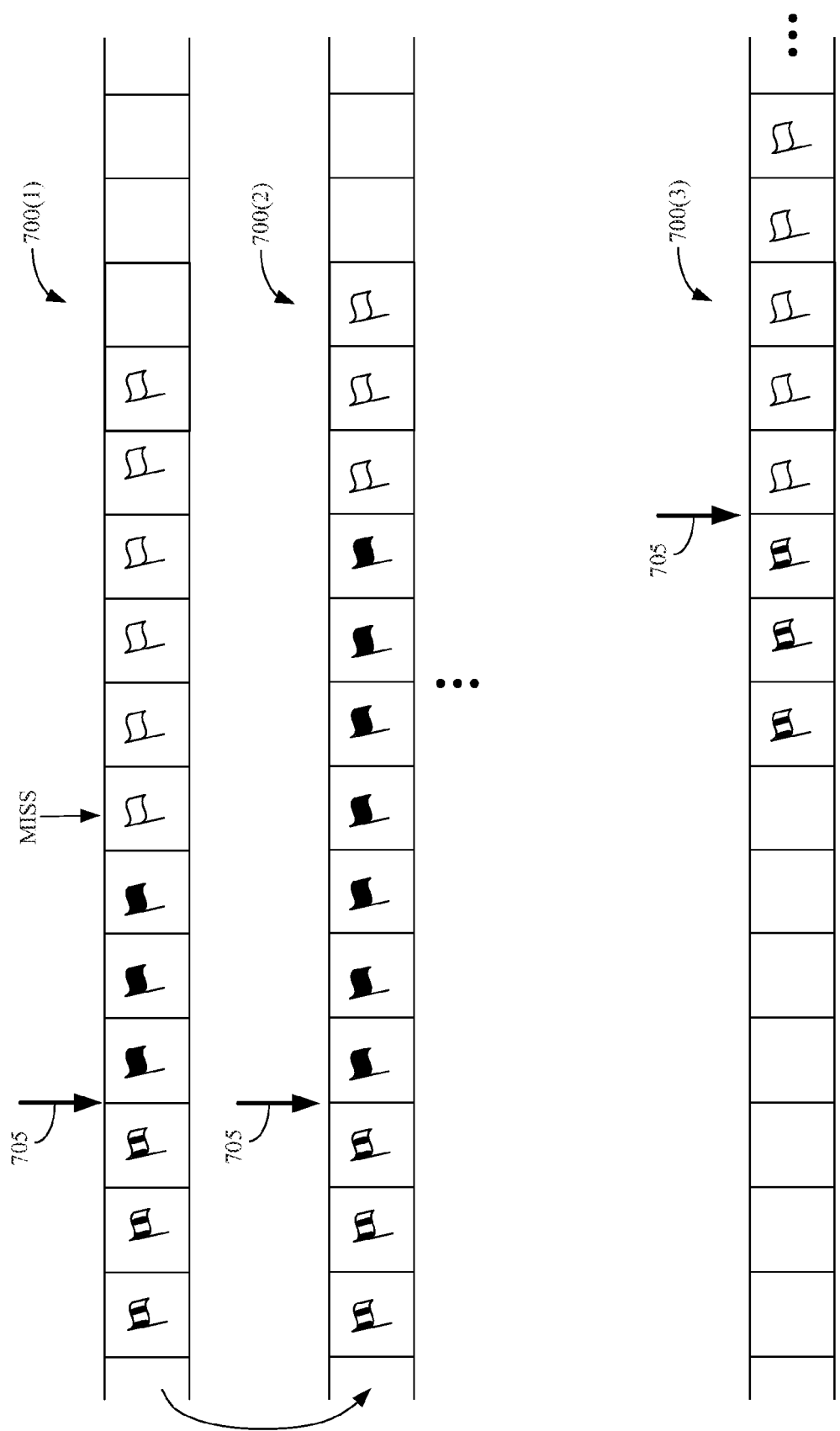
FIG. 7 conceptually illustrates a third exemplary embodiment of an address sequence that includes addresses that can be flagged and pre-fetched.

FIG. 7 conceptually illustrates a third exemplary embodiment of an address sequence 700 that includes addresses that can be flagged and pre-fetched. As in the first and second exemplary embodiments, the address sequences 700(1-3)

illustrate the same set of addresses at successive time intervals or clock cycles. In the illustrated embodiment, a pre-fetch stream engine has assigned flags to nine addresses ahead of a base address indicated by the arrow 705. The stream engine has also set three of the addresses ahead of the base address 705, as indicated by the filled-in flags, to indicate that the information in these addresses of the memory should be fetched into the cache. Three history flags have also been assigned to the addresses of the three most recently previously fetched addresses. In the illustrated embodiment, the stream engine detects a miss at an address in the sequence 700(1) that has been assigned a flag that is not in the subset of set flags but is the next address following the subset. The stream engine may therefore increase the aggressiveness of the pre-fetcher by setting four additional flags ahead of the base address, as indicated in the sequence 700(2). The pre-fetcher fetches the addresses that have set flags and advances the base address 705 until all of the addresses that have set flags have been fetched, as indicated in the sequence 700(3). As the address corresponding to each set flag is fetched, the flag associated with this address is changed into a history flag as shown in the address sequence 700(3). An additional flag is assigned to the next sequential address to maintain the number of flags ahead of the base address 705 and history flags are dropped to maintain a set number of history flags trailing the base address 705.

FIG. 8 conceptually illustrates a second exemplary embodiment of a method 800 or modifying the aggressiveness of a pre-fetcher based on memory access events. In the illustrated embodiment, a pre-fetcher stream engine has been trained to identify an address sequence including addresses that can be pre-fetched, e.g., so that the pre-fetched addresses are available for an application running on a processor in the system. The stream engine may have been trained using various techniques such as the method 300 shown in FIG. 3. In the illustrated embodiment, the stream engine detects (at 805) a cache hit to an address indicated in the miss address buffer. The stream engine determines (at 810) whether the cache hit is to address associated with a sequence address that is flagged with a history flag indicating that the information at this address has been fetched into the cache. When the cache hit corresponds to an address flagged with a history flag, the stream engine may set (at 815) additional flags ahead of the current base address. Depending on its address, a cache hit to a history flag may indicate that the pre-fetcher stream engine is at risk of falling behind the address requests. For example, a cache hit indicates that the pre-fetcher is predicting addresses correctly and keeping up with the demand requests. If the cache hit is to one of the oldest pre-fetch flags, then the pre-fetcher may set (at 815) a small number (or none) of the pre-fetch flags to maintain the fixed total of (say 3) flags set ahead of the hit address. Prefetching may actually get throttled from its current level in this case. Alternatively, if the cache hit is to one of the youngest pre-fetch flags, then the pre-fetcher may set (at 815) a larger number (say 2 or 3) of a pre-fetch flags to maintain the fixed total of flags set ahead of the hit address to accelerate the pre-fetching. Setting (at 815) flags ahead of the base address can therefore increase or decrease the aggressiveness of the pre-fetcher by allowing the pre-fetcher to fetch additional addresses whenever it has the opportunity.

FIG. 9 conceptually illustrates a fourth exemplary embodiment of an address sequence 900 that includes addresses that can be flagged and pre-fetched. As in the first and second exemplary embodiments, the address sequences 900(1-3) illustrate the same set of addresses at successive time intervals or clock cycles. In the illustrated embodiment, a pre-fetch stream engine has assigned flags to nine addresses ahead of a base address indicated by the arrow 905. Three history flags have also been assigned to the addresses of the three most recently previously fetched addresses. In the illustrated embodiment, none of the assigned flags have been set and so the pre-fetcher may be idle and may be waiting before fetching any information. Allowing the pre-fetcher to remain idle when none of the assigned flags have been set effectively reduces the aggressiveness of the pre-fetcher in circumstances where it may not be necessary to pre-fetch information associated with the stream.

In the illustrated embodiment, the stream engine detects a hit at an address in the sequence 900(1) that has been assigned a history flag. The stream engine may therefore increase the aggressiveness of the pre-fetcher by setting additional flags ahead of the base address, as indicated in the sequence 900(2). In one embodiment, the pre-fetcher determines the number of flags to set so that a select number of flags are either set flags or history flags ahead of the address of the cache hit. For example, the pre-fetcher can set two additional flags ahead of the base address 905 so that a total of three set flags or history flags are present ahead of the cache hit address, as shown in the sequence 900(2). The pre-fetcher fetches the addresses that have set flags and advances the base address 905 until all of the addresses that have set flags have been fetched, as indicated in the sequence 900(3). As the address corresponding to each set flag is fetched, the flag associated with this address is changed into a history flag as shown in the address sequence 900(3). An additional flag is assigned to the next sequential address to maintain the number of flags ahead of the base address 905 and history flags are dropped to maintain a set number of history flags trailing the base address 905. Once all the pre-fetch requests have been performed, the pre-fetcher may again become idle. The aggressiveness of the pre-fetcher may therefore be reduced by allowing the pre-fetcher to wait before fetching any additional lines.

Figure 10:
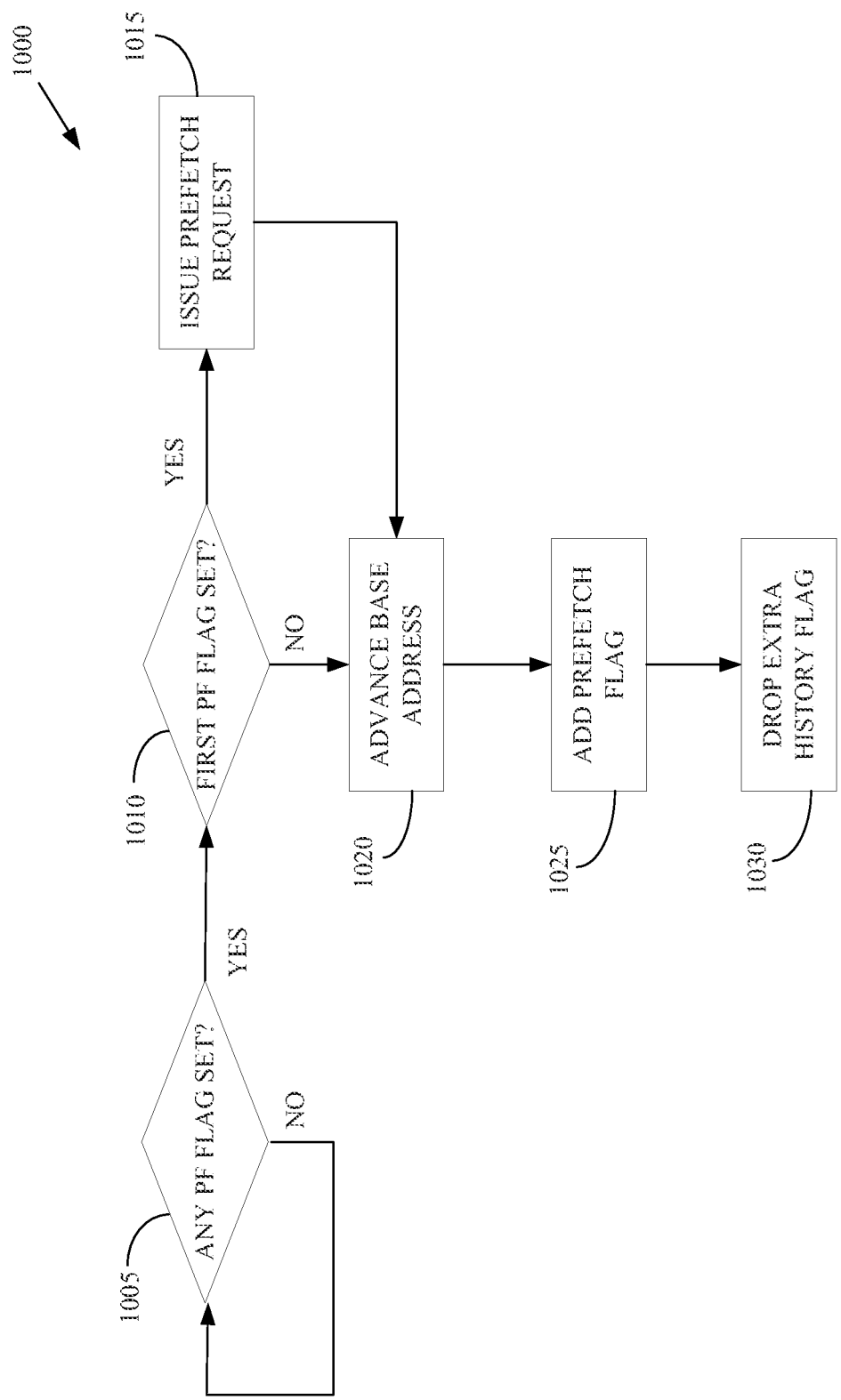
FIG. 10 conceptually illustrates one exemplary embodiment of a method of pre-fetching information using a look-ahead window defined by pre-fetch flags.

FIG. 10 conceptually illustrates one exemplary embodiment of a method 1000 of pre-fetching information using a look-ahead window defined by pre-fetch flags. In the illustrated embodiment, the pre-fetcher waits (at 1005) until it determines that a pre-fetch flag ahead of the current base address is set. When it determines (at 1010) that the first pre-fetch flag ahead of the base address is set, the pre-fetcher issues (at 1015) a pre-fetch request. The base address is then advanced (at 1020) to the next address in the address sequence of the current pre-fetch stream. If the pre-fetcher determines (at 1010) that the first-pre-fetch flag ahead of the current base address has not been set, then the base address is advanced (at 1020) without issuing (at 1015) a pre-fetch request. A new pre-fetch flag can be added (at 1025) by assigning the new flag to the next address ahead of any currently flagged addresses in the stream. Extra history flags can also be dropped (at 1030) to maintain a selected number of history flags in the look-ahead window.

Embodiments of processor systems that can implement dynamically adapt the pre-fetch aggressiveness as described herein (such as the processor system 100) can be fabricated in semiconductor fabrication facilities according to various processor designs. In one embodiment, a processor design can be represented as code stored on a computer readable media. Exemplary codes that may be used to define and/or represent the processor design may include HDL, Verilog, and the like. The code may be written by engineers, synthesized by other processing devices, and used to generate an intermediate representation of the processor design, e.g., netlists, GDSII data and the like. The intermediate representation can be stored on computer readable media and used to configure and control a manufacturing/fabrication process that is performed in a semiconductor fabrication facility. The semiconductor fabrication facility may include processing tools for performing deposition, photolithography, etching, polishing/planarizing, metrology, and other processes that are used to form transistors and other circuitry on semiconductor substrates. The processing tools can be configured and are operated using the intermediate representation, e.g., through the use of mask works generated from GDSII data.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method, comprising:
    modifying a rate for pre-fetching data from a memory into at least one cache by comparing a first address of a memory access request to addresses in an address window that comprises at least one previously fetched address and at least one address to be fetched, wherein modifying the rate comprises increasing an aggressiveness for prefetching data from the memory into said at least one cache in response to the memory access request hitting the first address in said at least one cache, wherein the first address matches said at least one previously fetched address.

2. The method of claim 1, comprising allocating a first pre-fetch stream in response to detecting cache misses to at least two sequential memory addresses and setting a base address for the first pre-fetch stream to a subsequent address in a sequence defined by said at least two sequential memory addresses.

3. The method of claim 2, comprising determining the address in the address window by assigning flags to a first number of addresses that are sequential with said at least two sequential memory addresses and setting a subset of the flags.

4. The method of claim 3, comprising iteratively fetching data from the addresses corresponding to the subset of the flags and advancing a base address to a subsequent address in response to each fetch so that said at least one previously fetched address comprises an address corresponding to a set flag.

5. The method of claim 1, comprising modifying the rate for pre-fetching data in response to detecting a cache miss to the first address when the first address is one of the addresses in the address window.

6. The method of claim 5, wherein modifying the rate for pre-fetching data comprises defining the address window by assigning flags to the addresses in the address window and setting a predetermined number of flags for the flagged addresses in sequence ahead of the first address when the first address corresponds to at least one previously fetched address, an address corresponding to the subset of the flags that have been set, or a next address in sequence after an address corresponding to a set flag.

7. The method of claim 1, comprising modifying the rate for pre-fetching data in response to detecting a cache hit to the first address when the first address is a previously fetched address in the address window.

8. The method of claim 7, wherein modifying the rate for pre-fetching data comprises defining the address window by assigning flags to the addresses in the address window and setting a predetermined number of flags for addresses in the address window that are in sequence ahead of the first address.

9. The method of claim 5 or 7, comprising:
    fetching data from a portion of the addresses in the address window ahead of a base address; and
    advancing the base address to the next address in the address window in response to each fetch.

10. The method of claim 1, comprising removing at least one of the previously fetched addresses from the address window when a number of previously fetched addresses exceeds a threshold value.

11. The method of claim 10, comprising assigning a flag to at least one address in sequence ahead of the address window in response to removing said at least one of the previously fetched addresses.

12. The method of claim 1, wherein modifying the rate for pre-fetching data from the memory into said at least one cache comprises increasing the aggressiveness for prefetching data from the memory into said at least one cache in response to the memory access request missing the first address in said at least one cache, wherein the first address matches said at least one previously fetched address.

13. The method of claim 1, wherein modifying the rate for pre-fetching data from the memory into said at least one cache comprises increasing the aggressiveness for prefetching data from the memory into said at least one cache in response to the memory access request missing the first address in said at least one cache, wherein the first address matches said at least one address to be fetched.

14. The method of claim 1, wherein modifying the rate for pre-fetching data from the memory into said at least one cache comprises throttling the aggressiveness for prefetching data from the memory into said at least one cache in response to the memory access request hitting the first address in said at least one cache, wherein the first address matches said at least one previously fetched address.

15. A processor comprising a pre-fetcher, the pre-fetcher, comprising:
at least one stream engine configured to modify a rate for pre-fetching data from memory into at least one cache by comparing a first address of a memory access request to addresses in an address window that comprises at least one previously fetched address and at least one address to be fetched, the stream engine to modify the rate by increasing an aggressiveness for prefetching data from the memory into said at least one cache in response to the memory access request hitting the first address in said at least one cache, wherein the first address matches said at least one previously fetched address.

16. A processor-based system, comprising:
a pre-fetcher configured to modify a rate for pre-fetching data from a memory into at least one cache by comparing a first address of a memory access request to addresses in an address window that comprises at least one previously fetched address and at least one address to be fetched, the pre-fetcher to increase an aggressiveness for prefetching data from the memory into said at least one cache in response to the memory access request hitting the first address in said at least one cache, wherein the first address matches said at least one previously fetched address.

17. The processor-based system of claim 16, comprising:
a miss address buffer, and wherein the pre-fetcher is configured to allocate a first pre-fetch stream in response to detecting cache misses to at least two sequential memory addresses indicated in the miss address buffer, and wherein the pre-fetcher is also configured to set a base address for the first stream to a subsequent address in a sequence defined by said at least two sequential memory addresses.

18. The processor-based system of claim 17, wherein the pre-fetcher is configured to determine a sequence of addresses in the address window by assigning flags to a first number of addresses that are sequential with said at least two sequential memory addresses and wherein the pre-fetcher is configured to set a subset of the flags.

19. The processor-based system of claim 16, wherein the pre-fetcher is configured to modify the rate for pre-fetching data in response to detecting a cache miss to the first address when the first address is one of the addresses in the address window.

20. The processor-based system of claim 19, wherein the pre-fetcher is configured to modify the rate for pre-fetching data by defining the address window by assigning flags to the addresses in the address window and setting a predetermined number of flags for the addresses in sequence ahead of the first address when the first address corresponds to at least one previously fetched address, an address corresponding to the subset of the flags that have been set, or a next address in sequence after an address corresponding to a set flag.

21. The processor-based system of claim 16, wherein the pre-fetcher is configured to modify the rate for pre-fetching data in response to detecting a cache hit to the first address when the first address is a previously fetched address in the address window.

22. The processor-based system of claim 21, wherein the pre-fetcher is configured to modify the rate for pre-fetching data by defining the address window by assigning flags to the addresses in the address window and setting a predetermined number of flags for the flagged addresses in sequence ahead of the first address.

23. The processor-based system of claim 16, wherein the pre-fetcher is configured to:
fetch data from the addresses corresponding to a subset of the addresses in the address window ahead of a base address; and
advance the base address to the next address in response to each fetch.

24. The processor-based system of claim 16, wherein the pre-fetcher is configured to remove at least one of the previously fetched addresses from the address window when a number of previously fetched addresses in the address window exceeds a threshold value.

25. The processor-based system of claim 24, wherein the pre-fetcher is configured to add at least one address to the address window in response to removing said at least one of the previously fetched addresses from the address window.

26. The processor-based system of claim 16, wherein the pre-fetcher is configured to increase the aggressiveness for prefetching data from the memory into said at least one cache in response to the memory access request missing the first address in said at least one cache, wherein the first address matches said at least one previously fetched address.

27. The processor-based system of claim 16, wherein the pre-fetcher is configured to increase the aggressiveness for prefetching data from the memory into said at least one cache in response to the memory access request missing the first address in said at least one cache, wherein the first address matches said at least one address to be fetched.

28. The processor-based system of claim 16, wherein the pre-fetcher is configured to throttle the aggressiveness for prefetching data from the memory into said at least one cache in response to the memory access request hitting the first address in said at least one cache, wherein the first address matches said at least one previously fetched address.

* * * * *